US011809284B2

United States Patent
Kohli et al.

(10) Patent No.: US 11,809,284 B2
(45) Date of Patent: Nov. 7, 2023

(54) SYSTEM AND METHOD OF CLONING A MULTI-TIERED APPLICATION

(71) Applicant: Infosys Limited, Bangalore (IN)

(72) Inventors: Prabhat Kohli, Panchkula (IN); Rohit Mohindru, Panchkula (IN)

(73) Assignee: INFOSYS LIMITED, Bangalore (IN)

( * ) Notice: Subject to any disclaimer, the term of this patent is extended or adjusted under 35 U.S.C. 154(b) by 287 days.

(21) Appl. No.: 17/112,468

(22) Filed: Dec. 4, 2020

(65) Prior Publication Data
US 2021/0182162 A1 Jun. 17, 2021

(30) Foreign Application Priority Data

Dec. 17, 2019 (IN) .............................. 201941052392

(51) Int. Cl.
*G06F 11/14* (2006.01)
*G06F 9/48* (2006.01)
*G06F 9/445* (2018.01)

(52) U.S. Cl.
CPC ...... *G06F 11/1469* (2013.01); *G06F 9/44505* (2013.01); *G06F 9/4881* (2013.01); *G06F 2201/80* (2013.01)

(58) Field of Classification Search
CPC ............ G06F 11/1469; G06F 9/44505; G06F 9/4881; G06F 2201/80
See application file for complete search history.

(56) References Cited

U.S. PATENT DOCUMENTS

| | | | | |
|---|---|---|---|---|
| 5,642,505 A | * | 6/1997 | Fushimi | ............... G06F 11/1469 |
| 6,487,558 B1 | * | 11/2002 | Hitchcock | ........... G06F 11/1415 |
| 7,493,377 B2 | * | 2/2009 | Finni | ................... H04L 41/0846 |
| | | | | 713/165 |
| 9,195,806 B1 | * | 11/2015 | Robinson | ............ G06F 12/1408 |

(Continued)

FOREIGN PATENT DOCUMENTS

| | | | | |
|---|---|---|---|---|
| WO | WO-2008124181 A1 | * | 10/2008 | ............... G06F 8/60 |
| WO | WO-2017070480 A1 | * | 4/2017 | .............. G06F 11/07 |

OTHER PUBLICATIONS

Quintero, Dino and Bodily, Shawn; "IBM PowerHA SystemMirror for AIX Cookbook"; Oct. 2014, IBM International Technical Support Organization; Second Edition, pp. 1-545 (Year: 2014).*

*Primary Examiner* — Matthew M Kim
*Assistant Examiner* — Indranil Chowdhury
(74) *Attorney, Agent, or Firm* — Troutman Pepper Hamilton Sanders LLP (57) ABSTRACT

A method and system of cloning a multi-tiered application is disclosed and it comprises of validating received source server configuration data against received target server configuration data. Further the data at a set of nodes on the target server is restored. The cloning of the multi-tiered application is initiated based on a set of predetermined rules, wherein the cloning comprises a set of sequential actions performed at each of the set of nodes. The method of cloning comprises of generating a set of dynamic configuration files for the set of nodes based on the predefined restore rules and the validation and also generating a set of tokens for the set of nodes to communicate status of refresh. Further the target application is restored based on the set of dynamic configuration files and the set of sequential actions at each of the set of nodes is performed based on the status of set of tokens.

20 Claims, 3 Drawing Sheets

(56) References Cited

U.S. PATENT DOCUMENTS

| | | | | |
|---|---|---|---|---|
| 9,442,708 | B1* | 9/2016 | Reeves | G06F 8/61 |
| 9,665,437 | B2* | 5/2017 | Bhargava | G06F 11/1446 |
| 9,891,907 | B2* | 2/2018 | Searle | H04L 41/082 |
| 10,817,382 | B2* | 10/2020 | Sekar | G06F 3/0607 |
| 11,616,834 | B2* | 3/2023 | Perneti | H04L 67/1097 |
| | | | | 709/219 |
| 11,645,175 | B2* | 5/2023 | Zakharkin | G06F 11/2092 |
| | | | | 714/4.11 |
| 11,675,520 | B2* | 6/2023 | Karr | G06F 3/065 |
| | | | | 711/154 |
| 2006/0047720 | A1* | 3/2006 | Kulkarni | G06F 11/1458 |
| 2011/0137934 | A1* | 6/2011 | Pizzorni | G06F 16/954 |
| | | | | 709/219 |
| 2011/0209140 | A1* | 8/2011 | Scheidel | G06F 11/0709 |
| | | | | 717/172 |
| 2011/0302647 | A1* | 12/2011 | Bhattacharya | H04L 41/0813 |
| | | | | 709/221 |
| 2015/0074060 | A1* | 3/2015 | Varadharajan | G06F 11/1458 |
| | | | | 707/649 |
| 2015/0309831 | A1* | 10/2015 | Powers | G06F 11/1474 |
| | | | | 718/1 |
| 2016/0291940 | A1* | 10/2016 | Searle | H04L 67/303 |
| 2017/0046232 | A1* | 2/2017 | Cadarette | G06F 3/065 |
| 2019/0042378 | A1* | 2/2019 | Wouhaybi | H04L 67/1051 |
| 2021/0034398 | A1* | 2/2021 | Khandkar | G06F 11/1464 |
| 2021/0182162 | A1* | 6/2021 | Kohli | G06F 11/2094 |
| 2021/0406274 | A1* | 12/2021 | Lei | H04L 67/1095 |
| 2022/0129429 | A1* | 4/2022 | Mohen | G06F 16/00 |
| 2022/0334725 | A1* | 10/2022 | Mertes | G06F 16/275 |
| 2022/0376970 | A1* | 11/2022 | Chawathe | G06F 11/3452 |
| 2023/0080046 | A1* | 3/2023 | Paul | G06F 16/188 |
| | | | | 707/822 |

* cited by examiner

SYSTEM AND METHOD OF CLONING A MULTI-TIERED APPLICATION

This application claims the benefit of Indian Patent Application Serial No. 2019/41052392, filed Dec. 17, 2019, which is hereby incorporated by reference in its entirety.

FIELD

This technology relates to a system and method of cloning a multi-tiered application. More specifically, technology relates to handshake of multi-tiered database and application systems that collaborate leading to Zero-Touch Automation.

BACKGROUND

Business enterprises typically store data in databases and there is increasing awareness among such enterprises that responsible data protection includes database backup, refresh and cloning. Other frequently used procedures include application refresh and cloning. Database backup includes periodically replicating data stored on a primary storage system and moving the copy to a secondary storage system. Database and application refresh includes periodically replacing data stored in a database and a small portion of data in the application on a secondary storage system with data from a database and application on a primary storage system. Database and application cloning includes periodically replacing data stored in a database and a medium portion of data in the application on a secondary storage system with data from a database and application on a primary storage system. Refreshed and cloned databases are typically used for development, testing, training or reporting purposes.

This has been one of the massive time consuming tasks in the current IT world which lacks standardization and automation. Most of the tasks are performed manually in the current scenario, which is time intensive. This adversely affects the frequency with which clones can be performed. This is also prone to errors due to the fact that manual editing of configuration files has to be performed which leads to inconsistencies between different refreshes.

It is extremely important to correctly perform the refresh as incorrect refreshes have lots of overhead in terms of efforts required to identify and correct the error situation. Incorrect data can have serious implications to business and may affect the turnaround time and productivity indicators. It also has a direct impact on cost, schedule and planning of a project. Huge time taken per refresh affects the availability of up-to-date data to dependent teams including testing and development environments There is an urgent need for a refresh or cloning system that solves the issues related to heartbeat or tokenization, dynamically generating configuration files and significantly reducing time associated per refresh. This requirement is to have target system or secondary system having similar/same size and capacity as source or primary system and is identical in all aspects.

SUMMARY

Disclosed are a system, method and apparatus for cloning a multi-tiered application In one aspect, a method of cloning a multi-tiered application is disclosed and it comprises of validating received source server configuration data against received target server configuration data. Further the data at a set of nodes on the target server is restored. The cloning of the multi-tiered application is initiated based on a set of predetermined rules, wherein the cloning comprises a set of sequential actions performed at each of the set of nodes. The method of cloning comprises of generating a set of dynamic configuration files for the set of nodes based on the predefined restore rules and the validation and also generating a set of tokens for the set of nodes to communicate status of refresh. Further the target application is restored based on the set of dynamic configuration files and the set of sequential actions at each of the set of nodes is performed based on the status of set of tokens.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Exemplifying embodiments, as described below, may be used to provide a method, an apparatus and/or a system for classification of data in a machine learning system Although the present embodiments have been described with reference to specific example embodiments, it will be evident that various modifications and changes may be made to these embodiments without departing from the broader spirit and scope of the various embodiments.

The description that follows makes references to various naming conventions, variables and utilities typically found in UNIX and ORACLE environments. It is assumed that the reader has a basic understanding of UNIX and ORACLE or can review one or more of the publicly available manuals or textbooks describing these widely used technologies.

In one embodiment, the automation of the cloning and/or refresh process is applicable in scenarios where data needs to be replicated/refreshed from one environment to the other. The refresh requirement may be from Production to non-production environment or from non-production to lower environments or vice versa. This is also applicable in multi-node environment involving database and/or web/app nodes. This makes the automation to be scalable. In another embodiment, replicating of data and application code/files from end-to-end using either snapshots, restores, Resource Manager (RMAN) backups and file system replications and communicates restore status between nodes using tokens (called heartbeat of the entire solution), is performed. The configurations are generated dynamically in the form of configuration files, allowing for the entire process of cloning and/or refresh to become automated with no human intervention. Error handling is performed along with reporting making this traceable and apt for tracking purpose.

Figure 1:
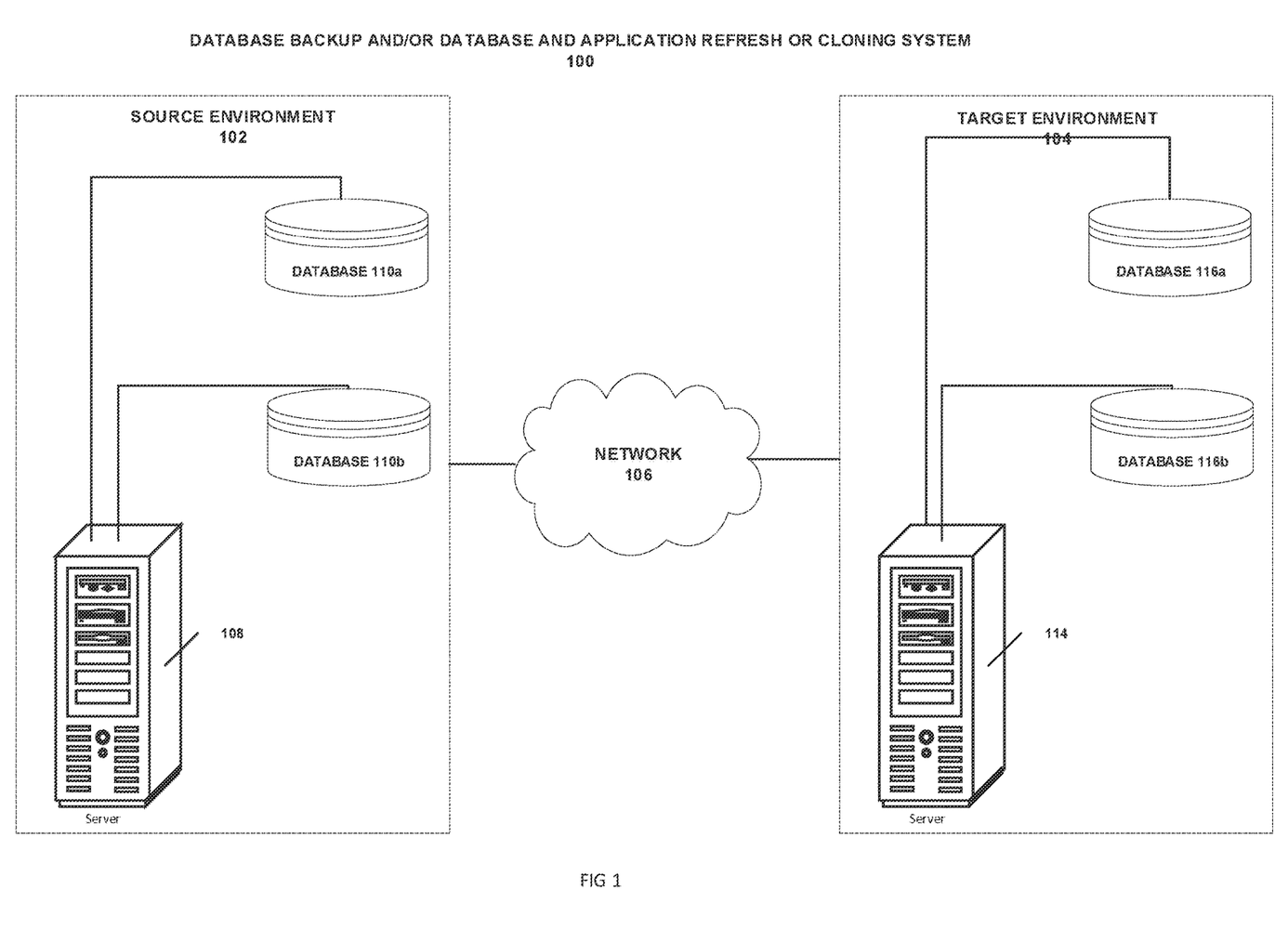
FIG. 1 is block diagram of an embodiment of an automated physical database backup and/or database and application refresh or cloning system.

FIG. 1 is block diagram of an embodiment of an automated physical database backup and/or database and application refresh or cloning system 100. The system 100 includes a source environment 102 (e.g., an application service provider (ASP)) and a target environment 104 (e.g., a datacenter) coupled to a network 106. The network 106 can be any known computer network used to transfer data, including without limitation the Internet, a local area network (LAN), and the like.

While only one source environment 102 and one target environment 104 are shown in FIG. 1, it would be apparent that multiple source environments 102 can communicate with multiple target environments 104 via multiple networks 106 using known distributed database technology (e.g., ORACLE distributed database architecture).

The source environment 102 includes a source server 108 and one or more databases 110. The source server 108 can be implemented on any suitable computing platform, but is preferably implemented on a UNIX-based platform. In the embodiment shown in FIG. 1, the source server 108 is a Secure Socket Shell (SSH) machine in the source environment 102 capable of making requests of agents (e.g., daemons) or SSH servers in the target environment 104. In some embodiments, the agents or servers perform various tasks associated with a database backup and/or database and application refresh or cloning process in response to requests from the source server 108.

The databases 110a and 110b are coupled to the source server 108 and include file systems and directories that can be accessed via a database management system (DBMS) (e.g., ORACLE RDBMS). During a backup operation, the source server 108 copies data files from one or more of the databases 110a and 110b and transfers the copied data files across the network 106 to the target environment 104.

The target environment 104 includes a target server 114 and one or more databases 116. The target server 114, and databases 116a and 116b can include conventional technologies, which can be the similar platform/hardware or different platform/hardware than found in the source environment 102. During backup, the data files from one or more databases 110 can be copied to one or more storage devices attached to source server 108 or target server 114 depending upon the configuration. In the case of cloning, for example, the data files belonging to database 110a can be copied to and overlaid on top of database 110b in the source environment 102, or one or more databases 116 in the target environment 104.

It should be apparent that other topologies for the system 100 can have more or fewer servers, databases and/or applications included in the source and target environments 102, 104, as well as other devices typically found in a computer network environment. Additionally, the source and target environments 102, 104, can be either physically connected or may be physically isolated and connected over a network In an embodiment of the present invention, and in reference to FIG. 2A and FIG. 2B, configuration data may be received from an exemplary production environment of a multi-tiered database and/or application to validate source and target systems. The validation is performed by reading the encrypted password file based on environment, to ascertain that received source server configuration data is homogenous to received target server configuration data. The associated password files may be encrypted to ensure a secure environment and to ensure secured transaction during the refresh and/or cloning process.

Figure 2A:
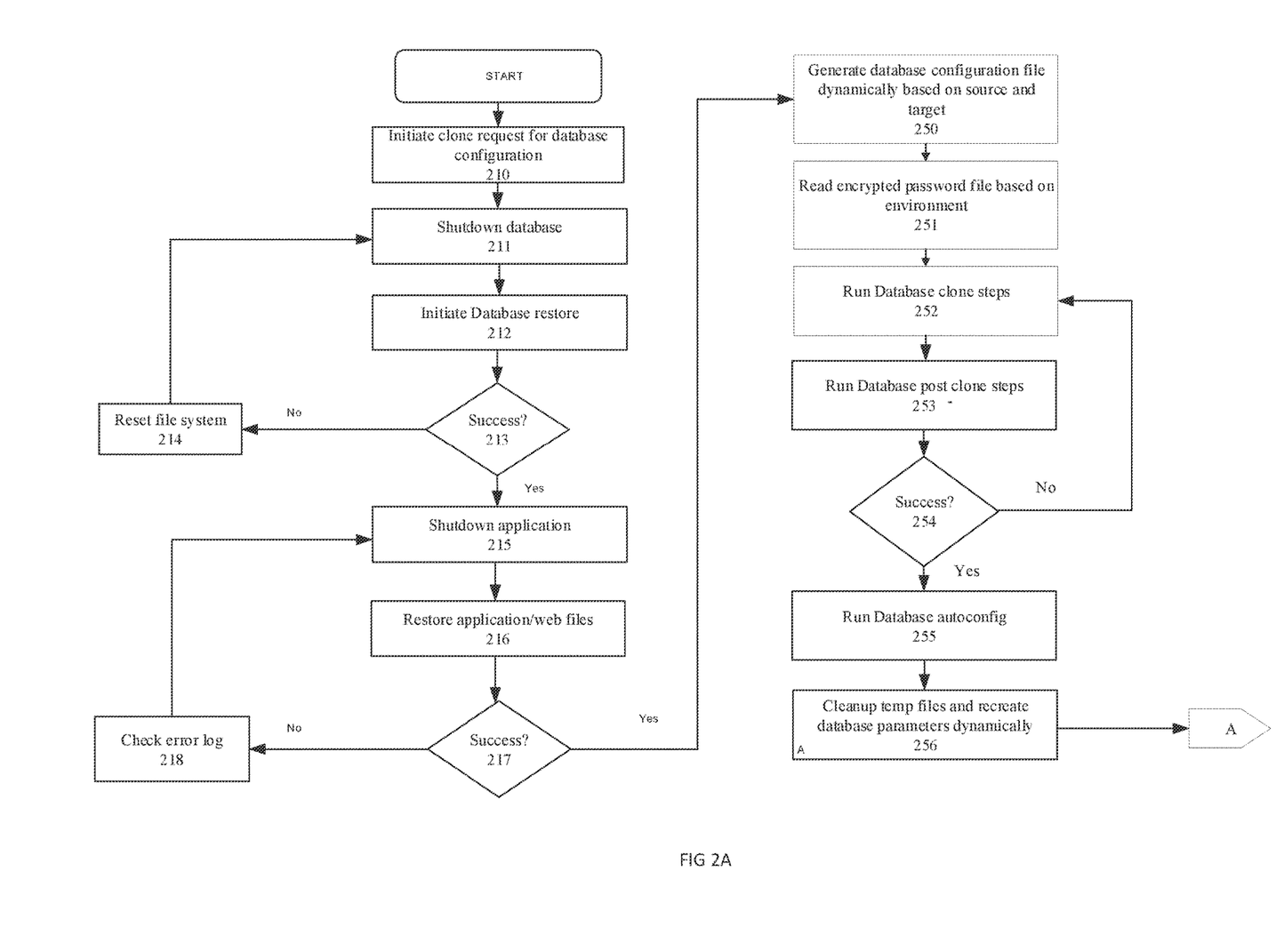
FIGS. 2A and 2B are schematic representation of the restore process being performed across the database and nodes associated with it.
Figure 2B:
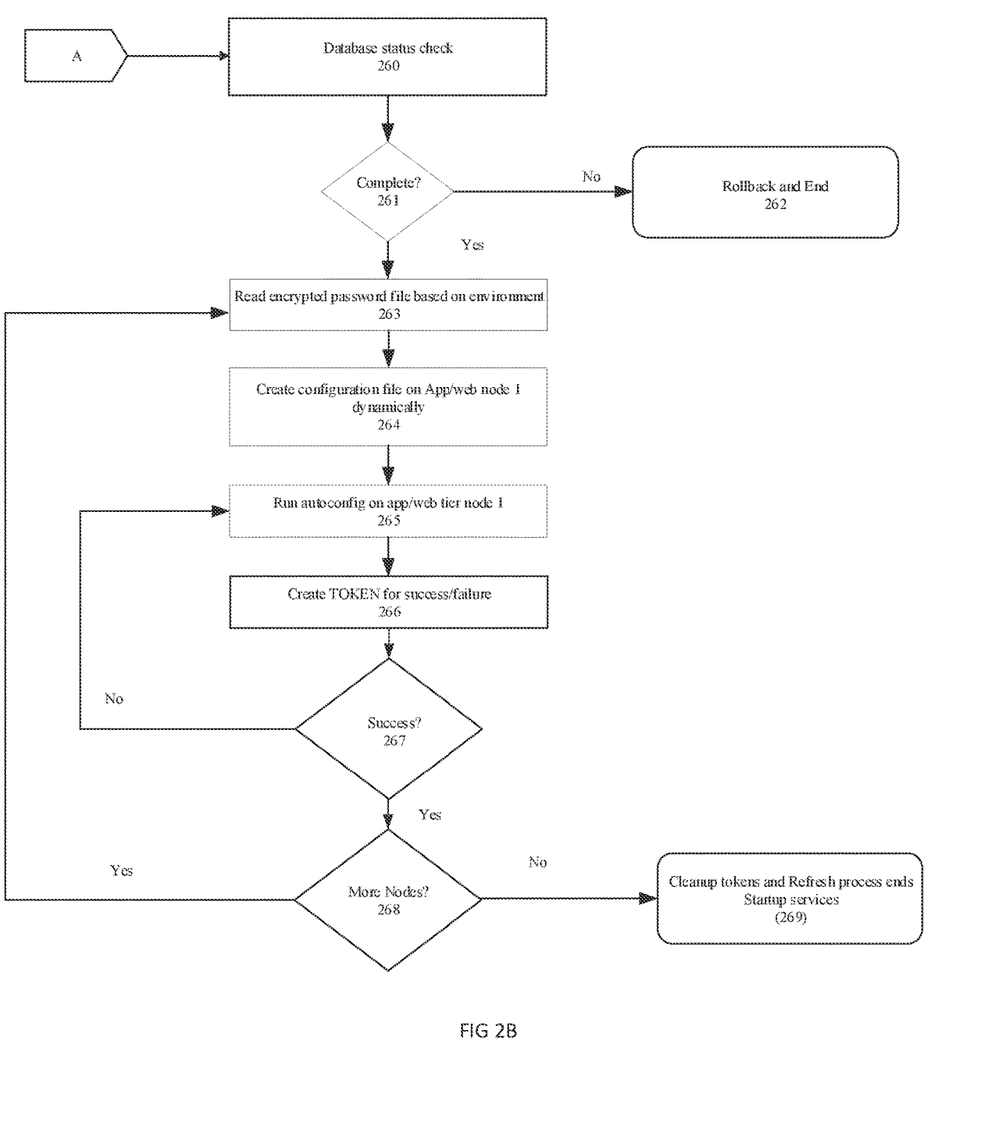

In another embodiment, cloning process comprises multiple actions being performed at various nodes in the multi-tiered application as will be explained in detail subsequently. Each action performed also indicates a phase in the cloning process which may be characterized by the actions performed at each node.

In another embodiment the steps performed on one node may include, but not limited to; Identification of nodes for refresh process, Shutdown of node, Initiation of restore, Validation of passwords and encryption, Generation of dynamic configuration files, Perform post refresh tasks, Running autoconfig to propagate changes to configuration files based on environment type, Generating appropriate TOKEN at each stage, Validation of refresh, Proceed to next set of nodes, Validation and completion of refresh.

In one embodiment, a predefined refresh schedule, stored in a scheduling agent, for the source and target environments may trigger the shutdown of services (211) on Application and/or web nodes. The shutdown may also be triggered on a need base manually from the scheduling agent. Upon triggering of the shutdown, the file system is cleaned up. The cleanup of the file system may include reset of file system (214) or creating a savepoint indicating that refresh would resume from the last point of stopping of the refresh process. Subsequently the associated database node/s is/are shutdown to allow for restore to begin.

The database restore (212) is triggered immediately after refresh process is initiated (210)

This is the first step in refresh/cloning process. The database refresh needs to be performed based on the timestamp identified for the refresh/cloning. The restore script (database RMAN utility) includes the database refresh, as a subsequent step and the restore script may be modified based on schedule for which the restore is to be performed. The restore operation is governed by various predefined rules like, without limitation, type of restore (target and source environment), schedule of restore, channels/parallel processed to use in a restore and configuration files. A refresh script may validate the configuration of the source and the target systems for the availability of an estimated memory space required for restore/refresh process to be undertaken. In the case of sufficient memory space not being available, the script may be configured to abort the cloning process that include the refresh and/or restore processes, to abort.

In an alternative embodiment, the refresh script may create a savepoint and show an error, indicating a memory space deficit to perform the cloning/restore.

After the successful completion (213) of the database restore operation, post database—restore/clone tasks may be performed.

In one embodiment, the post database restore tasks may include password changes, running auto configuration tasks, reset tempfiles etc. In particular, password file is encrypted and stored in a secure file, which is read during the refresh process, which uses this password file as input to access corresponding secured files and to gain access to the corresponding datafiles.

In a subsequent embodiment, tempfiles are reset (256) as part of refresh process. A database refresh script is configured to initiate this step using "alter database", "reset tempfile" commands. The scheduling agent is configured to trigger the database refresh script as per the automated schedule or a manual restore action being initiated. The reset of tempfiles is database centric task which is required for recreation of database control files required to build the database stored inside the database.

In another embodiment, a set of configuration files are generated dynamically (250) for the respective nodes based on the predefined restore rules and the validation (251) is performed by reading the encrypted password file based on environment, over the source and target systems. The associated password files may be encrypted to ensure a secure environment and to ensure secured transaction during the refresh and/or cloning process. Auto-configuration tasks of, but not limited to, running database clone steps (252) and running database post clone steps (253) are performed based on the dynamic configuration files generated and tasks that are initiated to perform application/web tier specific configurations. The configuration files and the corresponding configuration parameters are validated and automated based on source and target system. If during status check (254) there is any error during validation or running post clone steps, the database clone steps (252) are performed again. The commands specific to application e.g. autoconfig.pl initiate this within refresh script. After the files have been generated successfully, auto configuration scripts (255) are run to ensure the changes are propagated and once this step completes successfully, cleanup of residual files (256) like temp files, log files and database parameter file update (256) based on environment is done.

In another embodiment tokens for corresponding nodes are generated (266) to communicate status of refresh to the nodes at which the restore operations are performed. The status of refresh may be STARTED, ERROR and COMPLETED. Database status (260) is checked if it is complete or not (261)—if it is successful, it moves to next node in the refresh process. If the status is ERROR, then rollback and refresh process ends/abends (262).

Files on Application/web node are restored (216) based on the requirement. This is performed using restore commands or using an API if data is stored in a library until all the associated application and web nodes are completed successfully. The restore commands may vary based on the location of the system, wherein the system may be located locally or it may be remotely located. If the restore is not successful (217), error log will be checked (218) and based on the error, application will be shutdown (215) and next steps will be executed or reinitiated.

Encrypted password file containing encrypted account (application and database) passwords based on specific source and target environment, is read (263) and configuration file on application/web server (264) is generated based on source and target systems configurations. The source system has a configuration file specific to its environment. Based on target environment configuration, data is matched and xml data is read and modified using a combination of grep and sed unix commands. The required/expected values on target system and content is replaced depending on a match or a mismatch. The required/expected valued and the content are replaced using sed unix commands that matches actual value in the configuration file against expected value and replaces the tag based on match outcome. The tag identifies the location of content and values indicating whether they exist on the source system or the target system.

Matching of the data is performed based on application specific parameters which are expected to be changed across environments like, without limitations, URLs, end-points, file system paths, number of CPUs, turning a configuration on or off, changing hostname or logical system names etc.

In another embodiment, configuration tasks (265) for the multi-tier application refresh on application/web server are run and services are brought up. Post refresh tasks on nodes are performed which include setting up of environment variables, running auto configuration—which will propagate changes made in configuration files to all required application/web files as needed, to ensure the target system is correctly configured In one embodiment, dependencies between nodes is established. e.g. database node starts first, then concurrent manager nodes followed by application and web nodes. Dependencies between nodes is established so that nodes wait for dependent node(s) to complete to begin their tasks. The generated tokens (266) indicate the status of task completion (267) to the corresponding nodes and are used by dependent nodes to perform the respective tasks. If all the nodes are executed successfully and there are no more nodes (268) to process, tokens are cleaned up, services are started and refresh process abends (269). If there are more nodes, then refresh process will move to next node as per the topology and proceed to read encrypted password file based on environment (263).

In another embodiment, all subsequent app/web nodes generate their configuration files using grep and sed commands and perform the required refresh steps in the required order on each server as provided in the dynamically generated configuration file. The refresh steps include, without limitation, validating passwords, running auto configuration, checking and validating configuration files, checking and replacing xml tags.

In one more embodiment, e-mail alerts and logging is enabled at each and every step containing savepoints so that reporting to track progress and traceability in case of errors can be done In another embodiment, tokens are cleaned up towards end of restore to allow fresh system for next iteration of refresh. Tokens can be cleaned up if there is an error or if the entire clone process is completed. The tokens are cleaned up using rm commands. The environment is then released to end-users and made operational In one exemplifying embodiment an end to end process in the form of a demonstration of automated process performing refresh of data from a set of source environment(s) to target environment(s) is described here below. The source architecture contains one or more database nodes, application nodes and web tier nodes with similar target architecture. The source node comprises Database Node(s): sdbnode1, Application Node(s): sappnode1, sappnode2 and Web Node(s): swebnode1. The Target environment comprises Database Node(s): tdbnode1, Application Node(s): tappnode1, tappnode2 and; Web Node(s): twebnode1.

Since data refresh/clone needs to be performed based on a point of time, a file is created and may be named SNAPSHOT_TIME on a shared file system called "/shared_mount". This may contain the timestamp for the required restore point. Contents of the file are "#cat SNAPSHOT_TIME" & "1 Sep. 2019 10:00:00 AM".

Before starting the refresh process, certain database information is preserved. This preserved data are the parameters like users, credentials, application configurations, roles and responsibilities. This will be enabled by exporting the data to a local or network file system which will be imported once the database is restored from source system.

Subsequently entire application/databases on target node are shut down. This requires to shutdown services in the following order;

1. Shutdown services running on web tier nodes
2. Shutdown services running on app tier nodes
3. Shutdown databases and listener running on databases nodes "ps -eaf" commands are run on the respective nodes to verify that the services have been brought down successfully. If any services are found to be running, they are manually stopped to ensure file system is clean and ready for restore.

After the services have been brought down, database/application/web files restore is enabled in the following order
1. Database nodes
2. Application nodes
3. Web nodes Database restore is performed for the set of database files, control files, redo log files and tempfiles based on the timestamp file (SNAPSHOT_TIME) as recorded Once the restore is successfully complete, the control proceeds to create a TOKEN called DATABASE_NODE1_RESTORE_COMPLETE on the shared file system called/shared_all/refresh/<timestamp>

Next step is to dynamically generate the configuration file associated with database tier. This file will compare source values with the target values and wherever there is mismatch, will replace the current value with the expected value. The parameters/values to be compared can be node name, URL, port information, topology values, virtual hostnames etc. This entire process of generating configuration files dynamically will help save lots of time from a refresh perspective. Using the above generated configuration file, database configuration steps will be performed to propagate the configurations related to database nodes into the respective configuration files. Once the configuration steps are complete, a TOKEN called DATABASE_NODE1_CONF_FILES_COMPLETE is created on the shared file system called/shared_all/refresh/<timestamp>. In case of any failure, a token confirming the same called DATABASE_NODE1_CONF_FILES_FAILED will be created. After configuration file has been generated and database configurations have been cascaded to respective files, certain post steps related to database refresh will be carried out. These post steps include Cleaning up temporary files (tempfiles), restore of credentials related to users specific to the instance and importing application data. Database will be brought up and running at the end of this step.

Once the post steps are complete, a TOKEN called DATABASE_NODE1_POST_STEPS_COMPLETE is created on the shared file system called/shared_all/refresh/<timestamp>. In case of any failure, a token confirming the same called DATABASE_NODE1_POST_STEPS_FAILED will be created. In the next step Cleanup of application tier files is performed. This step will wait for previous step to complete. Unless this step finds DATABASE_NODE1_POST_STEPS_COMPLETE token, it will not proceed and will error out after a pre-defined time. After the post refresh steps on database nodes completes successfully, the application tier files on all the application nodes are cleaned up. All application data located on shared file system will be cleaned to ensure the source application data/files are restored on it.

Application restore is performed for the set of application files, log files and configuration files based on the timestamp file (SNAPSHOT_TIME) as recorded initially.

On Node 1: Once the restore is successfully complete on node1, a TOKEN called APPLICATION_NODE1_RESTORE_COMPLETE is created on the shared file system called/shared_all/refresh/<timestamp>

On Node 2: Once the restore is successfully complete on node2, a TOKEN called APPLICATION_NODE2_RESTORE_COMPLETE is created on the shared file system called/shared_all/refresh/<timestamp>

Next step is to dynamically generate the configuration file associated with application tier (nodes 1 and 2). This will be performed on the target environment. The configuration files will compare source values with the target values and wherever there is mismatch, will replace the current value with the expected value.

This step is required to be performed on both target application node 1 (tappnode1) and application node 2 (tappnode2).

Using the above generated configuration file, application configuration steps will be performed to propagate the configurations related to application nodes into the respective configuration files.

For tappnode1: Once the restore is complete, a TOKEN called APP_NODE1_CONF_COMPLETE is created on the shared file system called /shared_all/refresh/<timestamp>

At Node1: In case of any failure, a token confirming the same called APP_NODE1_CONF_FAILED will be created.

For tappnode2: Once the restore is complete, a TOKEN called APP_NODE2_CONF_COMPLETE is created on the shared file system called /shared_all/refreshi<timestamp>

At Node2: In case of any failure, a token confirming the same called APP_NODE2_CONF_FAILED will be created.

All app node services will be up and running at the end of this step once completed successfully.

The step of moving to web tier will wait for previous step to complete. Unless this step finds APP_NODE2_CONF_COMPLETE token i.e. last application node, it will not proceed and will error out after a pre-defined time.

After the configuration steps are successfully completed on application tier, the command moves to web tier. After the post refresh steps on application nodes complete successfully, web tier files are cleaned up. All web tier data located on shared file system will be cleaned to ensure the source web data/files are restored on it.

File restore is performed for the set of web tier files, log files and configuration files based on the timestamp file (SNAPSHOT_TIME) as explained above.

Next step is to dynamically generate the configuration file associated with web tier node. This will be performed on the target environment i.e. twebnode1. The configuration files will compare source values with the target values and wherever there is mismatch, will replace the current value with the expected value. Using the above generated configuration file, web tier configuration steps will be performed to propagate the configurations related to web node(s) into the respective configuration files.

Once the configuration steps have been completed correctly refresh steps on web tier are performed. This will involve running configuration commands, refreshing the configurations containing URLs, ports, paths etc. and bringing up the web tier services. Once the restore is complete, a TOKEN called WEB_NODE1_CONF_COMPLETE is created on the shared file system called /shared_all/refresh/<timestamp>. In case of any failure, a token confirming the same called WEB_NODE1_CONF_FAILED will be created and autoconfig steps (265) on corresponding app/web tier node will be run again.

If there are no more nodes to process in the refresh, the subsequent step is to shut down and startup (269) the entire application/databases on target node. If there are more nodes, the refresh process will move to reading password file based on the target environment (263) and subsequent steps will be executed.

This will require to shutdown services in the following order
1. Shutdown services running on web tier nodes
2. Shutdown services running on app tier node 2
3. Shutdown services running on app tier node 1
4. Shutdown databases and listener running on databases nodes In order to achieve the above, startup services are required to be started in the following order
1. Startup databases and listener running on databases nodes
2. Startup services running on app tier node 1
3. Startup services running on app tier node 2
4. Startup services running on web tier nodes After the refresh process is completed and validated, tokens will be cleaned up (269) and environment will be released to end users after successful validation of database, application and web tiers.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Moreover, as disclosed herein, the term "computer-readable medium" includes, but is not limited to portable or fixed storage devices, optical storage devices and various other mediums capable of storing, or containing data.

Accordingly, the specification and drawings are to be regarded in an illustrative rather than a restrictive sense.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of cloning a multi-tiered application, comprising:
   validating received source server configuration data of a source server against received target server configuration data of a target server;
   restoring data at a set of nodes on the target server;
   initiating the cloning of the multi-tiered application based on a set of predetermined rules, wherein the cloning comprises a set of sequential actions performed at each node of the set of nodes;
   generating:
      a set of dynamic configuration files for the set of nodes based on predefined restore rules and the validation;

a set of tokens for the set of nodes to communicate status of refresh;
restoring a target application based on the set of dynamic configuration files; and
performing the set of sequential actions at each node of the set of nodes based on the status of refresh of a corresponding node communicated by a corresponding token of the set of tokens.

2. The method of claim 1, wherein the multi-tiered application comprises an application and a database.

3. The method of claim 2, wherein the source server configuration data and the target server configuration data are received as input from a production version of the application and the database.

4. The method of claim 1, wherein the set of sequential actions comprises a set of tasks performed at the set of nodes corresponding to the corresponding token, of the set of tokens, for each node in the set of nodes.

5. The method of claim 1, wherein the set of dynamic configuration files are generated for the set of nodes, based on the predefined restore rules and the validation of the source server configuration data and the target server configuration data.

6. The method of claim 1, wherein the set of tokens for the set of nodes are generated to communicate the status of refresh to the set of nodes at which the restoration of data is performed.

7. The method of claim 1, further comprising instantiating a set of target database parameters for the restoration of the data at the set of nodes.

8. The method of claim 1, wherein the set of nodes comprises a database node, manager nodes, application nodes and web nodes.

9. The method of claim 1, wherein the set of tokens are cleaned up based on one of encountering an error and completion of the cloning of the multi-tiered application.

10. A system of cloning a multi-tiered application, comprising:
a processor; and
a memory coupled to the processor, wherein the processor executes programmed instructions stored in the memory and is configured to:
validate received source server configuration data of a source server against received target server configuration data of a target server;
restore data at a set of nodes on the target server;
initiate the cloning of the multi-tiered application based on a set of predetermined rules, wherein the cloning comprises a set of sequential actions performed at each node of the set of nodes;
generate:
a set of dynamic configuration files for the set of nodes based on predefined restore rules and the validation;
a set of tokens for the set of nodes to communicate status of refresh;
restore a target application based on the set of dynamic configuration files; and
perform the set of sequential actions at each node of the set of nodes based on the status of refresh of a corresponding node communicated by a corresponding token of the set of tokens.

11. The system of claim 10, wherein the multi-tiered application comprises an application and a database.

12. The system of claim 11, wherein the source server configuration data and the target server configuration data are received as input from a production version of the application and the database.

13. The system of claim 10, wherein the set of sequential actions comprises a set of tasks performed at the set of nodes corresponding to the corresponding token, of the set of tokens, for each node in the set of nodes.

14. The system of claim 10, wherein the set of dynamic configuration files is generated for the set of nodes, based on the predefined restore rules and the validation of the source server configuration data and the target server configuration data.

15. The system of claim 10, wherein the set of tokens for the set of nodes is generated to communicate the status of refresh to the nodes at which the restoration of data is performed.

16. The system of claim 10, wherein the processor is further configured to instantiate a set of target database parameters for the restoration of the data at the set of nodes.

17. The system of claim 10, wherein the set of nodes comprises a database node, manager nodes, application nodes and web nodes.

18. The system of claim 10, wherein the set of tokens are cleaned up based on one of encountering an error and completion of the cloning of the multi-tiered application.

19. A non-transitory computer readable medium having stored thereon instructions for cloning a multi-tiered application, the non-transitory computer readable medium comprising machine executable code which when executed by a processor, causes the processor to perform steps comprising:
validating received source server configuration data of a source server against received target server configuration data of a target server;
restoring data at a set of nodes on the target server;
initiating the cloning of the multi-tiered application based on a set of predetermined rules, wherein the cloning comprises a set of sequential actions performed at each node of the set of nodes;
generating:
a set of dynamic configuration files for the set of nodes based on predefined restore rules and the validation;
a set of tokens for the set of nodes to communicate status of refresh;
restoring a target application based on the set of dynamic configuration files; and
performing the set of sequential actions at each node of the set of nodes based on the status of refresh of a corresponding node communicated by a corresponding token of the set of tokens.

20. The non-transitory computer readable medium of claim 19, wherein the multi-tiered application comprises an application and a database.

* * * * *